United States Patent [19]

Orillion

[11] 4,249,520
[45] * Feb. 10, 1981

[54] PYRAMIDAL ENERGY COLLECTOR SYSTEM

[76] Inventor: Alfred G. Orillion, 1201-E Cleermont Cir., Huntsville, Ala. 35801

[*] Notice: The portion of the term of this patent subsequent to Jan. 2, 1996, has been disclaimed.

[21] Appl. No.: 972,893

[22] Filed: Dec. 26, 1978

Related U.S. Application Data

[63] Continuation-in-part of Ser. No. 800,745, May 26, 1977, Pat. No. 4,132,221.

[51] Int. Cl.³ .............................................. F24J 3/02
[52] U.S. Cl. .................................. 126/439; 126/450; 126/448; 136/246
[58] Field of Search .................. 136/89 PC, 89 HY; 126/270, 271, 438, 439, 450; 52/82

[56] References Cited

U.S. PATENT DOCUMENTS

| 2,167,576 | 7/1939 | Kiser | 126/271 |
| 2,213,894 | 9/1940 | Barry | 126/271 |
| 3,244,186 | 4/1966 | Thomason et al. | 126/270 |
| 3,841,302 | 10/1974 | Falbel | 126/270 |
| 4,132,221 | 1/1979 | Orillion | 126/271 |

FOREIGN PATENT DOCUMENTS 688037  6/1964  Canada ................................. 126/451

Primary Examiner—Carroll B. Dority, Jr.
Attorney, Agent, or Firm—C. A. Phillips

[57] ABSTRACT

A radiation energy collector system in which an energy absorber is positioned within a pyramidal enclosure of which approximately one-half of the side area is radiation energy transmissive, and the other side and base area having a reflective inner surface, whereby radiation energy passing through the transmissive side area in part directly impinges on the absorber, and in part is reflected onto the absorber.

2 Claims, 16 Drawing Figures

PYRAMIDAL ENERGY COLLECTOR SYSTEM

This is a continuation-in-part of application Ser. No. 800,745, filed May 26, 1977 and now U.S. Pat. No. 4,132,221.

BACKGROUND OF THE INVENTION

1. Field of the Invention

This invention relates to solar energy collecting systems, and particularly to a new combination of an enclosure and an absorber or collector.

2. General Description of the Prior Art

In the past few years, and even before, many configurations of solar energy collectors have been proposed and some of them marketed. The principal problem today with solar energy collectors, either for heat or for electricity conversion, is, as with most products, providing an acceptable balance between cost, effectiveness, and durability. The fact that no single configuration has really captured the market is an indication that optimum designs are yet to appear. Considering the known types, perhaps the most common one for heat collection is the flat plate collector wherein a dark colored heat receiver is encased within an enclosure having a transparent or translucent face through which solar radiation directly impinges on the receiver and having a bottom side which is heavily insulated. Typically, the receiver contains a passageway or passageways through which a liquid, to be heated, is circulated. Depending upon the material through which the receiver is constructed, and thereby often its durability, a flat plate collector costs in the vicinity of $8.00 to $14.00 per square foot of active surface, with typical installation costs for a domestic hot water heater system running $800.00 to $2,000.00. This high cost is in part because of a typical requirement that there be a liquid-to-liquid heat exchanger to heat potable water and the use of a special fluid which flows between the heat receiver and the heat exchanger in order to avoid freezing or corrosion and deposits on the passageways of the heat receiver, which would render the receiver inoperative or ineffective after a relatively short period (in terms of the typical and expected life of a heating system, or even a hot water system, of 5 to 15 years). For electricity conversion, perhaps the most common one is a flat plate module arrangement of a number of photoelectric or photovoltaic cells, or solar cells (terms used interchangeable), encased within an enclosure having a transparent cover through which sunlight passes and impinged directly onto the solar cells. Typically, each solar cell is connected to electrical conductors which are brought to terminal connectors from which the electrical power may be taken. These flat plate solar cell modules, or photovoltaic arrays, are constructed such that the heat from the photoelectric cells may be removed from the back side, which are away from the sun, to keep the solar cells within the desired operating temperature range. Typically, a number of these modules are electrically connected together, as a photovoltaic system operational arrangement, to get the desired power at a desired voltage level. Currently, the cost of electricity using such module arrays is from $7.00 to 418.00 per watt. This high cost is due primarily to the expensive manufacturing processes to produce the photosensitive semi-conductor material for the solar cell. The delicate photoelectric cell semi-conductor must be protected from the effects of the environment to which it is exposed. A thin transparent covering is usually required to protect the solar cell surface from handling during manufacturing and assembly; beyond this, the amount of protective covering depends on the planned application. For space applications, sufficient covering must be used to protect the surface of the solar cells from micrometeorites; generally glass is used as the protective covering to minimize degradation from ultraviolet radiation. For terrestrial applications, the environment is more harsh due to dust, rain, hail, and other projectiles; glass is likewise preferred, but it is expensive and susceptible to breakage from impacts and thermal stresses. Polymer coverings are less expensive than glass and are more flexible but degrade in time due to ultraviolet radiation effects. A technique to reduce the cost and provide some protection to the solar cells is to utilize a photovoltaic system in conjunction with an enclosed concentrator device. For terrestrial applications, one such device is a linear trough-like arrangement in which the solar cells are located at the bottom with the sun-sensitive surface facing up toward the top of the trough, which is covered with a transparent material, such as glass. The sides slope up and outward to the top and are covered inside with a reflective material. In such an arrangement, the solar cells can be covered with a thin layer of glass as the trough top transparent covering protects them from the external environment. A portion of the sunlight entering the trough would strike the solar cells directly, and most of the remainder would strike the reflective inner sides and, in turn, be reflected and concentrated down onto the solar cells. Within limits, photoelectric cell power output is proportional to the amount of light striking it. Consequently, concentrators take advantage of this phenomenon getting more power out of the solar cells than that obtainable if the solar cells were in the usual flat plate arrangement. A significant problem with some types of known photovoltaic concentrators is that they must be adjusted in tilt for the sun's seasonal attitude and must track the sun throughout the day to be effective.

In an effort to solve some of the foregoing problems in collecting solar energy to heat water and to directly convert to electricity, some design improvements and research have been made. As an example, heretofore, it has been proposed that where the object is to heat water, a potable hot water tank itself be encased in a heat receiving enclosure, and that in addition to utilizing direct radiation from the sun, some reflected radiation be captured and furnished to the tank. One such system is illustrated in the September 1976 issue of "Popular Science" magazine, starting on page 101. This system employs an elongated tank in an enclosure with an elongated front and with two of the sides forming a light transmissive trapizoid. The back side, with a reflective inner surface, is parallel to the front side, and the top and bottom sides are perpendicular to the plane of the other sides and are heavily insulated. A difficulty with this configuration is that for optimum performance, it must be adjusted in attitude for the latitude of the location and as a function of the altitude (varying with seasons) of the sun. Preferably, some azimuth changes should be made through the day, i.e., tracking of the sun, for best solar energy capture.

To achieve direct conversion of sunlight into electricity utilizing photoelectric cells, solar cells, much research and development work has been done and is still being sponsored by the U.S. Department of Energy (DOE). The current mainstream effort by DOE is centered around their "Low-Cost Silicon Solar Array" (LSSA) Project. The prime emphasis of the LSSA Project is to develop low-cost silicon semi-conductor photoelectric cells and to assemble the cells into low-cost modules, each having a power output of approximately 10 to 15 watts. DOE is also doing some research and development work on photovoltaic solar concentrators.

Considering the foregoing, it is an object of this invention to overcome the stated problems, and particularly to provide an effective solar energy collector which may be used to directly heat potable water and/or provide an efficient photovoltaic system that is long-lasting, and is of a configuration which provides a substantial measure of angular compensation, enabling it to be constructed with a fixed orientation, and yet be of improved effectiveness despite significant variations in both azimuth and altitude (seasons and latitude) of the sun.

SUMMARY OF THE INVENTION

In accordance with this invention, an absorber is centrally positioned in a pyramidal structure wherein the floor of the structure is made radiation energy reflective, and the upper region of the structure is divided between a side region, extending part way around, which has a radiation reflective characteristic and a side region which is radiation energy transmissive. Solar radiation would pass through the radiation transmissive portion of the structure and a portion directly strike the absorber and the balance significantly reflected onto the absorber. This configuration does not require tilting. Its design is such that the base is set in a horizontal plane, and the angle of the sloping sides may be readily adjusted for latitude locations to improve solar collector efficiency. However, without any adjustment for latitude, and with sides permanently set at a fixed angle in the range of 40° to 80°, the system is very efficient.

DETAILED DESCRIPTION OF THE DRAWINGS

Figure 1:
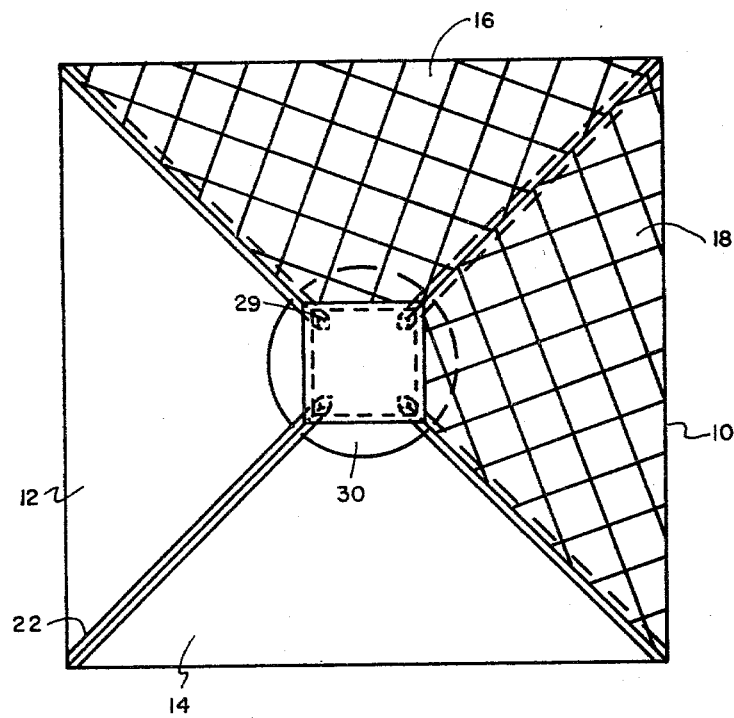
FIG. 1 is a plan view of an embodiment of this invention.
Figure 2:
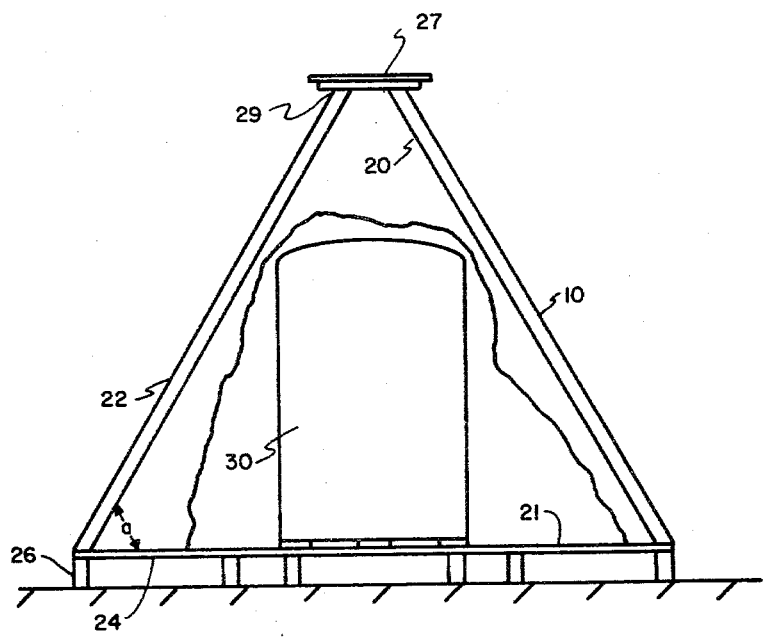
FIG. 2 is an elevational view with a portion of the side wall cut away to illustrate the interior arrangement.

Referring initially to FIGS. 1 and 2, a pyramidal enclosure 10 is constructed wherein triangular panels 12 and 14 are light transmissive, and triangular panels 16 and 18 and opaque and constructed with an interior reflective surface 20. Additionally, the surface 21 of base 24 is reflective. The angle "a" (measured vertically from the horizontal) for the panels would be in the range of 40° to 80°. The panels are supported on frame members 22 which are supported at their bottom by base 24, typically of plywood, this base then being supported by pillars or elongated planks 26. The tops 29 of frame members 22 are connected, by means not shown, to a flat rain cap or plate 27 which additionally functions to generally prevent leakage at the point of connection of the panels at the top. As a typical illustration, the base of each wall panel would be approximately 64 inches, and the height of the unit would be approximately 50 inches with flat rain cap 27, and 56 inches without rain cap 27. Alternately, the whole upper structure may be formed of one piece. In the center of enclosure 10 is positioned an energy absorber, such as a water tank 30, typically holding approximately 48 gallons, and having a diameter of 20 inches and a height of 32 inches. With this configuration, the tank extends upward a generally maximum amount within the enclosure, that is, to a point where there is a small clearance between the top of the tank and closest engagement to side wall panels. For purposes of interpretation, the term tank implies a single vessel of any shape, e.g., a cylinder or sphere, or a cluster of vessels that are interconnected, or a spiral of tubing; all configured to contain a fluid or allow passage thereof.

Wall panels of the reflective portion of the enclosure, panels 16 and 18, would typically be constructed of wood, metal, fiberglass, or a plastic material, with reflective surfaces 20 and 21 being a reflective coated plastic, such as aluminized mylar, or of reflective aluminum foil. Light transmission panels 12 and 14 are typically formed of a transparent or translucent material, such as plastic or glass. Top rain cap 27 may simply be of wood, plastic, or metal construction and may alternately embody or support a cupola which would have thermostatically controlled vents to enable excess heat in the enclosure to be discharged, if such should occur. Alternately, in order to effect safe operating conditions when the absorber is a tank to heat water, a pressure relief valve may be connected to tank 30 which would simply open and discharge any unsafe pressure condition arising from too high a temperature in the enclosure and causing steam to be formed.

Figure 3:
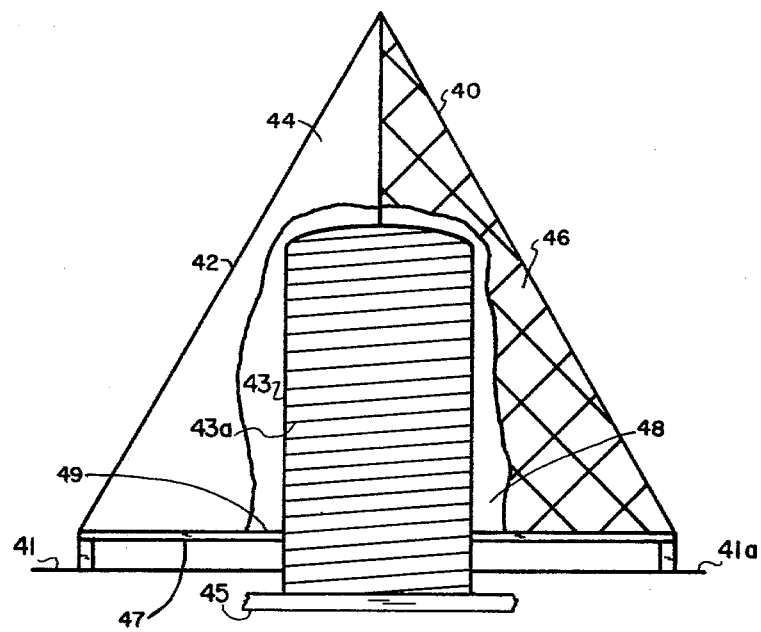
FIG. 3 is an elevational view of an alternate form of this invention wherein the upper enclosure is formed of one piece and the absorber protrudes through the base.

FIG. 3 illustrates a modified form of conical or pyramidal enclosure 40 wherein the upper structure is formed of one piece of light transmissive material. One-half of the side walls, the front half 42, as shown, would be of light transmissive material 44, and the other half, the back half 46 being opaque as a result of having an inner reflective surface 48. The inside of base 47 would have an inner reflective surface 49. Enclosure 40 is mounted on a roof 41, and tank 43 is formed of spiralled tubing 43a which extends into building 41a where it is supported on a base 45.

Figure 4:
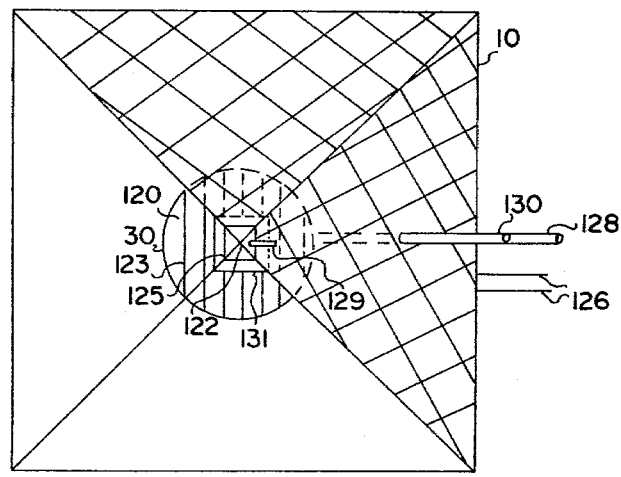
FIG. 4 is a plan view of an embodiment of this invention in which photoelectric cells are mounted on a tank as an energy absorber.
Figure 5:
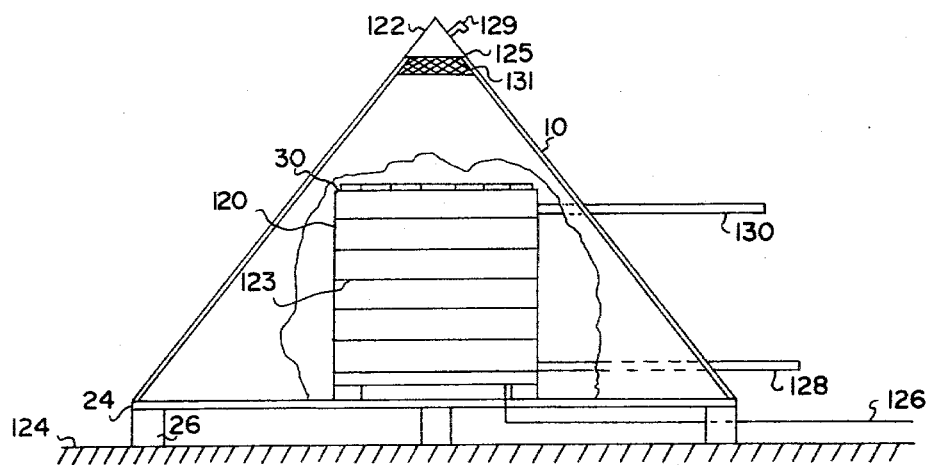
FIG. 5 is an elevational view of an embodiment of the invention with a portion of the side wall cut away to illustrate an interior arrangement of photoelectric cells mounted on a tank.

Alternately, referring to FIGS. 4 and 5, the energy absorber within enclosure 10 is a tank 30 having photoelectric cells, or solar cells, 120 mounted on outer surface 123. Typically, this arrangement would be identical to that shown in FIGS. 1 and 2 with tank 30 set upon base 24 above ground level 124 on pillars 26. Alternately, top portion 125 enclosure 10 would be covered by a form fitting cap 122 having a vent 129 for venting air in and out through and over water absorbing desiccant bed 131, e.g., silica gel, to minimize water vapor within enclosure 10. Solar cells 120 would be electrically connected to a pair of power output leads 126. It is necessary to cool the solar cells, and this is accomplished by heat transferring from the back side of the solar cells through the wall of tank 30 and hence into a cooling liquid, such as water, within the tank. The heated water would leave the tank through exit line 130 and be replaced by cooler water entering inlet line 128 from a heat exchanger, as, for example, as shown in FIG. 6.

Where a high electrical power output capability is desired, a plurality of solar energy absorbers of the type shown in FIGS. 4 and 5 would be connected together. In such an arrangement, power output leads 126 of each would be electrically connected in a desired series and/or parallel arrangement to obtain a power output at a desired voltage level. In such use, cooling inlet lines 128 and exit lines 130 of each unit may be connected in a parallel arrangement to obtain adequate flow through each tank for proper cooling.

Figure 6:
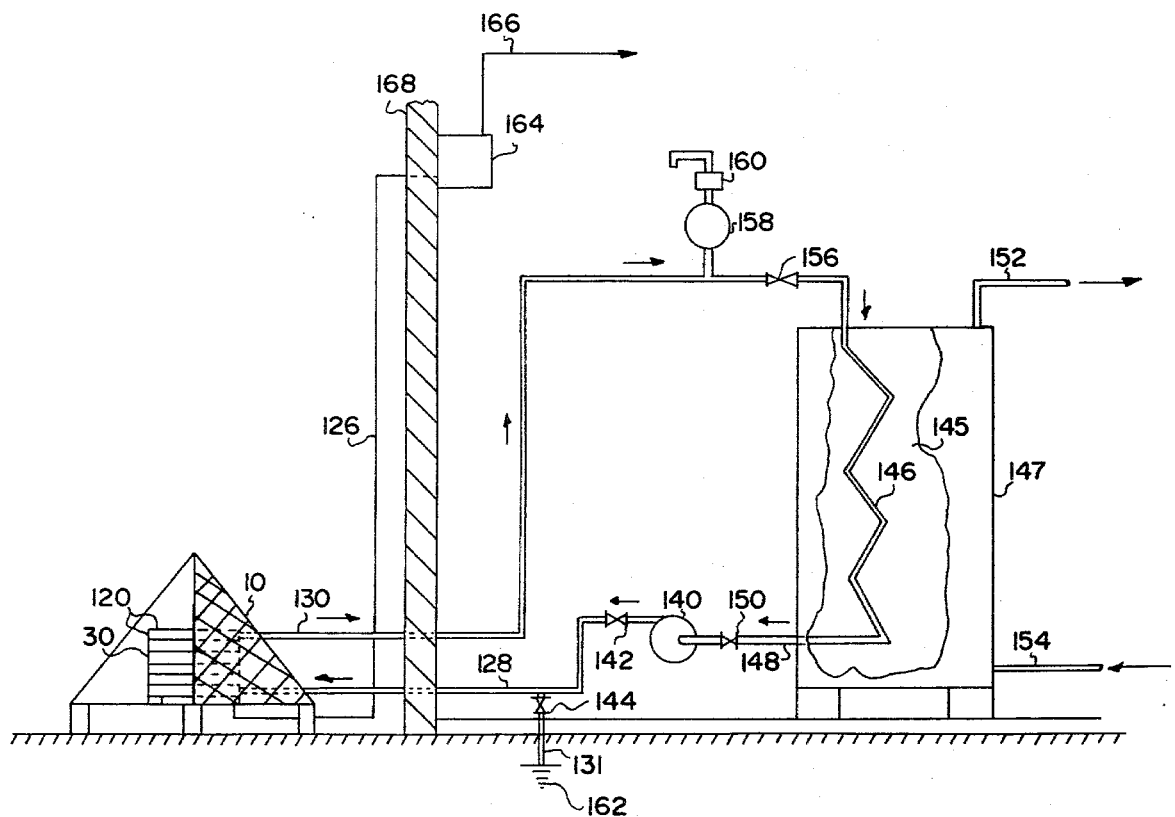
FIG. 6 is a schematic illustration of a completed system in which photoelectric cells are mounted on a tank.

A typical arrangement for removing heat from within solar cells 120 on tank 30 is illustrated in FIG. 6. In this case, pump 140 would pump liquid through normally open cut-off valve 142 through inlet line 128 into solar cell covered tank 30 within enclosure 10. In inlet line 128 is located a drain valve 144 to effect draining of the liquid cooling circuit through line 131 into sump 162. The heated liquid would leave solar cell covered tank 30 through exit line 130 and pass through normally open cut-off valve 156 and into heat exchanger 146 located in large tank 147. The liquid flows through heat exchanger 146 and is cooled by transferring heat to liquid 145, such as water, within large tank 147 and then out of heat exchanger 146 into line 148, through normally open cut-off valve 150 and into pump 140. The heated liquid 145 in large tank 147 is removed through exit line 152 and replaced with cooler liquid through inlet line 154. Connected in line 130 is a reservoir/surge tank 158 which upon the top is located a fill/vent valve system 160 to allow filling of the cooling circuit or to admit air to effect draining of the cooling circuit, when drain valve 144 is opened, into sump 162. The liquid in the cooling circuit may be pure water, an anti-freeze solution, or an oil. Electric power from the solar cells is collected by power output leads 126 which are connected, typically, to a conventional power output control unit 164; from there the power would be sent to a power storage or distribution system through power lines 166. The cooling circuit heat exchanger 146 may be immersed in a liquid, as indicated in FIG. 6, for liquid-to-liquid heat exchange or, alternately, may be in the air and connected to a blower system for liquid-to-air heat exchange. Normally, enclosure 10 would be external to a building, represented by wall 168, which houses the valves, pump controls, and other related equipment.

Figure 7:
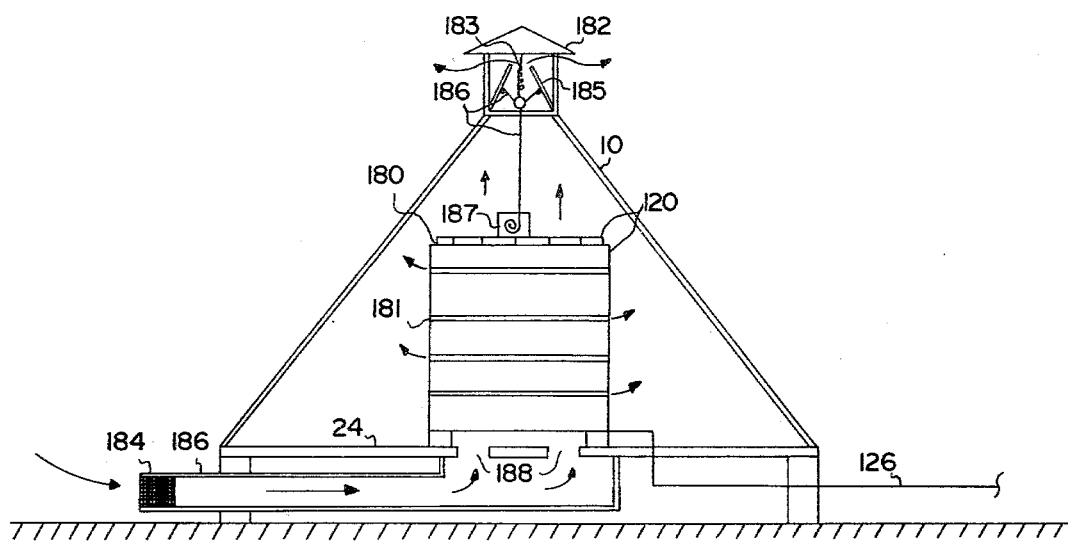
FIG. 7 is an elevational view in which photoelectric cells are mounted on an open grid structure, and a system is provided for automatic introduction of cooling air into the enclosure to cool the photoelectric cells.

The systems thus far described are for the purposes of heating liquids using solar energy, and for the combination of efficient means of converting sunlight directly into electricity using photoelectric cells, and heating water in the process of keeping the photoelectric cells cooled. However, arrangements are contemplated for direct electrical conversion within a pyramidal enclosure with solar cell cooling accomplished with air. A typical such arrangement is shown in FIG. 7 in which photoelectric cell arrays 120 are mounted on the periphery of an open grid structure or shell 180, being hollow in the center, and constructed with air gaps 181 between the arrays, located in central region of pyramidal enclosure 10. Installed on top of enclosure 10 in a cupola 182 that provides a means to allow air, by convection, to flow through vent doors 185 as controlled by linkages 186 and bi-metallic temperature sensor 187. At a predetermined minimum temperature, the cupola vent doors 185 open, thereby allowing warm air to flow out by convection forces and be replaced by cooler air entering through filler 184, flowing through duct 186, through vent holes 188 in enclosure base 24 and through the inside of enclosure 10. Vent holes 188 are positioned underneath shell 180, whereby cooling air would flow up inside the hollow portion of shell 180 and out between the arrays through air gaps 181 and effectively cooling the solar cells of arrays 120. Cupola vent doors 185 automatically close at night by return spring 183 in cold climates to reduce the temperature cycling of the solar cells. Power would be extracted from photoelectric cell arrays 120 through power output leads 126. Although the temperature controlling action described herein is an automatic mechanical system, it is appreciated that this could be done by electrical sensors and electrical activation of vent doors 185, and, in addition, an inducted draft or forced draft fan could be employed.

Figure 8:
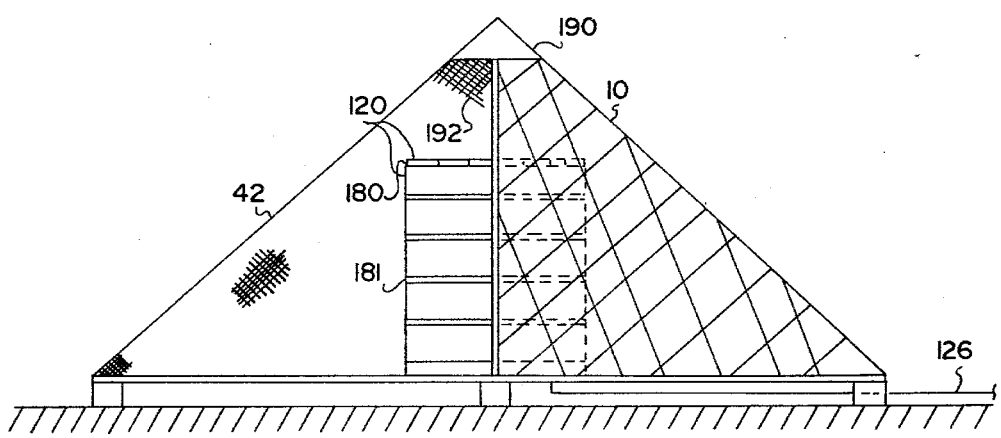
FIG. 8 is an elevational view of an alternate arrangement in which a transparent side of an enclosure is open to the atmosphere, but covered with a protective wire mesh to allow free flow of air over the photoelectric cells for cooling.

Another air cooling arrangement allowing free flow of air could be employed in embodiments of this invention as shown in FIG. 8. As envisaged, pyramidal enclosure 10 would not have a covering on the light transmissive side 42, that is, it would be open to the atmosphere. For mechanical protection of insides of the enclosure, a wire mesh cover 192 is placed over light transmissive open side 42. In this arrangement, photoelectric cell arrays 120, mounted on shell 180, are cooled by the free flow of air over the solar cells and through air gaps 181. A connection cap 190, positioned at the top apex of enclosure 10, connects adjoining ends of adjoining sides and the wire mesh cover 192.

Figure 9:
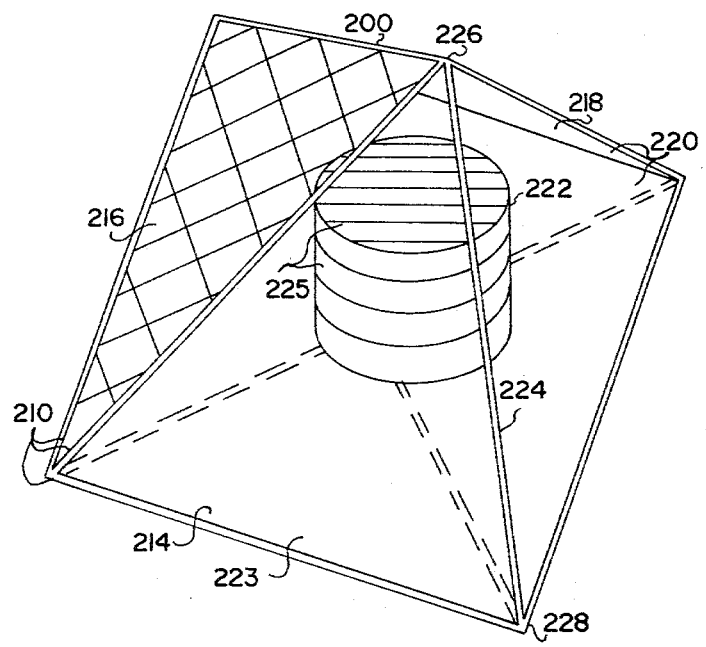
FIG. 9 is an oblique illustration of an embodiment of the invention when used as a photovoltaic system for outer space application.

Thus far, emphasis on uses of the invention have been terrestrial applications. However, this invention is equally applicable for solar energy collection in space, particularly for generating electrical power. Of major concern for space operations is the total amount of mass that must be sent up from earth to perform this or any other function. A feature of this invention is that it provides means for higher solar energy collection for a given mass in space than systems currently in use or as far as is known, now contemplated. An example of the employment of the present invention in space is illustrated in FIG. 9. As shown, pyramidal enclosure 200 is constructed of framework members 210 about the periphery of base 214, the two triangular-shaped sides 216 and 218, and diagonally across the base, for structural integrity. Stretched between the framework members 210, forming base 214 and the two sides 216 and 218, is a thin plastic covering 200 having an inward facing reflective surface. Sides 216 and 218 extend approximately one-half way around the enclosure; the balance, side 223, is open. A stabilizing strut 224 extends from the top apex 226 of the enclosure to opposite corner 228 of base 214, bisecting the open side 223. In the central region of enclosure 200 is a cylindrical support structure 222 upon which is mounted photoelectric cell arrays 225. With the open side 223 of enclosure 200 oriented toward the sun, sunlight would directly strike the solar cells of arrays 225 facing the sun and also reflective surfaces of covering 220 on base 214 and sides 216 and 218. The resulting reflected radiation would be concentrated and directed onto all of the solar cells of arrays 225 covering structure 222. In such an arrangement, the typical dimensions of each the diameter and height of structure 222 would be in the range of $\frac{1}{4}$ to $\frac{1}{2}$ the length of one side of base 214. By proportionally selecting the height of the enclosure, and hence the resulting dimensions of sides 216 and 218, concentration ratios (the ratio of the projected reflective inner surfaces to the total area of solar cells) much greater than one can be obtained, allowing high power outputs from the solar cells and resulting in fewer solar cells being required for a particular power output level over that required from a flat plate arrangement. Since the mass of enclosure 200 is about 10% to 15% of the mass of the photoelectric cell arrays 225 and structure 222, this is a mass efficient combination particularly adapted for space applications.

Figure 10:
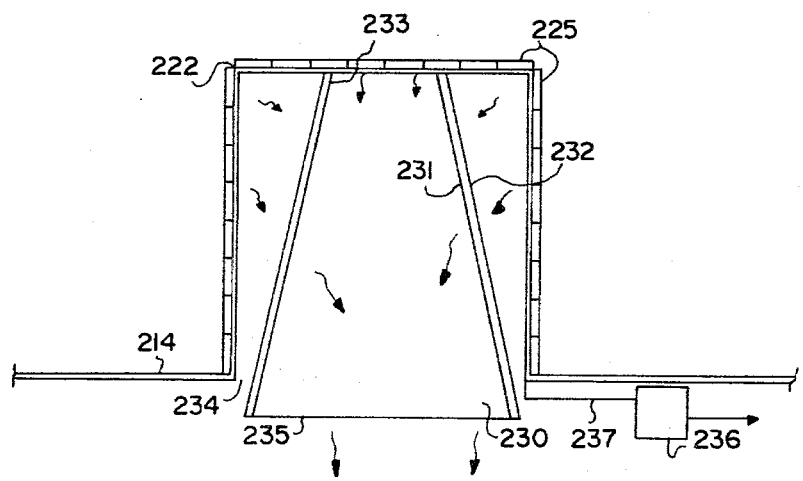
FIG. 10 is a cut-away elevational view of a structure on which the photoelectric cells are mounted showing a truncated cone heat sink structure employed to cool photoelectric cells in an outer space application.
Figure 11:
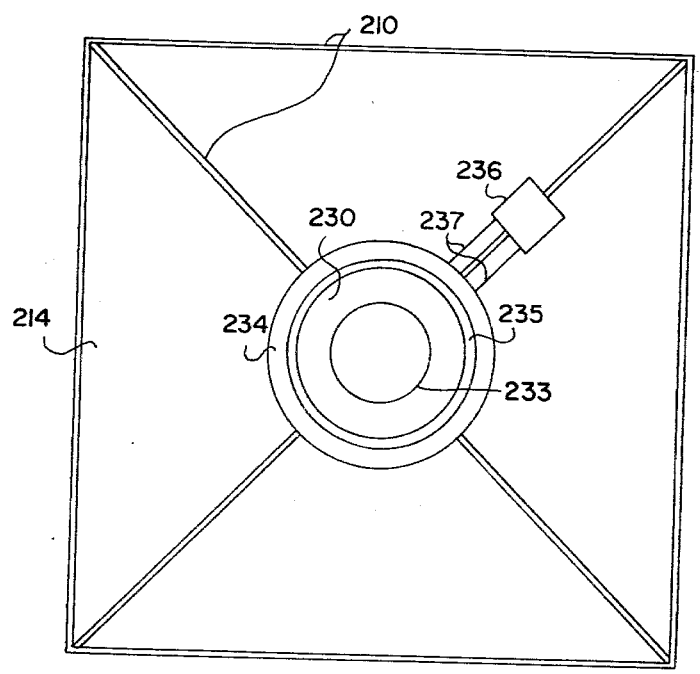
FIG. 11 is an underside view of an embodiment of the invention as would be used in outer space and employing a truncated cone heat sink.

FIGS. 10 and 11 illustrate means for removing heat from photoelectric cell arrays 225 in a space application. Sides 216 and 218 are omitted in FIG. 10 for purposes of simplification of illustration. As shown in this cut-away view, cylinder support structure 222 includes an internal heat sink 230 constructed as a truncated cone of solid thin material having good thermal conductive properties, such as aluminum. The inner and outer surfaces 231 and 232 are colored black. The small end 233 of heat sink 230 is connected to the underside of the top of structure 222 which supports the photoelectric cells arrays 225. The larger conical end 235 of heat sink 230 extends through an opening 234 in base 214. In this arrangement, heat from the photoelectric cells would radiate to a cooler outer surface 232 of heat sink structure 230, be conducted through its thin wall, and then be re-radiated from the inside surface 231 out to black space. The electric power from solar cell arrays 225 would be collected and brought out through output power leads 237 to power output control unit 236 which, in a conventional manner, would convert and/or distribute the power for use.

Figure 12:
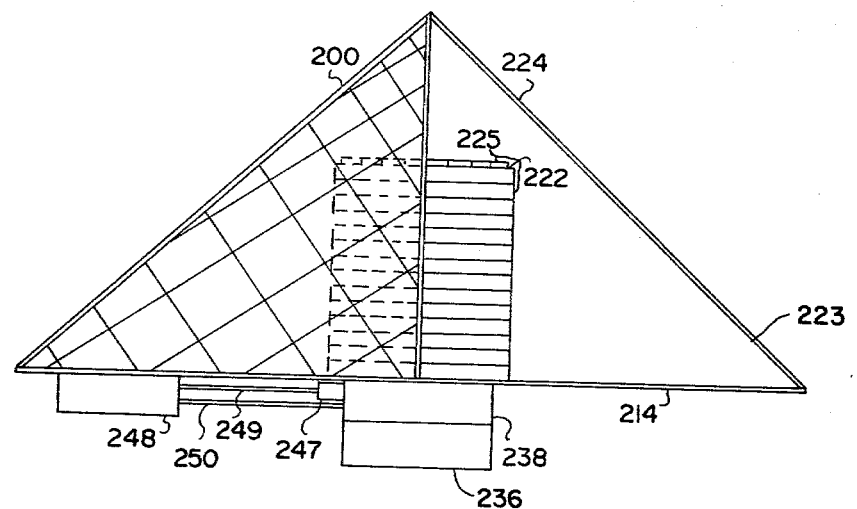
FIG. 12 is an elevational view of an embodiment of the invention used as a photovoltaic system for outer space use and employing a cooling liquid system to remove heat from photoelectric cells.
Figure 13:
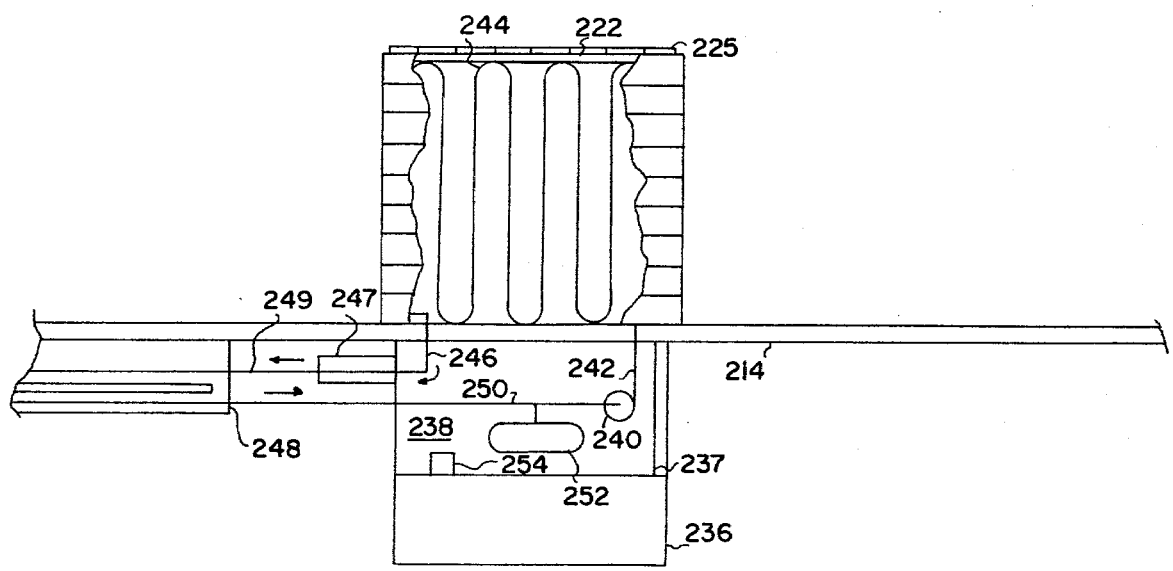
FIG. 13 is a diagrammatic cut-away view of a liquid cooling system for space application of the invention.

Another arrangement for removing heat from solar cells is to utilize a liquid coolant system, as illustrated in FIGS. 12 and 13. In this arrangement, photovoltaic arrays 225 on a structure 222 are cooled by coolant coils 244 attached to the inside wall of structure 222. In general, a liquid coolant is circulated by means of a pump 240 of coolant control system housing 238 through distributor line 242 to coolant coils 244 and then through exit line 246. As a further feature of this invention, and as illustrated in FIG. 13, the coolant fluid as heated by the solar cells is fed through power generating system 247 including means (not shown) to convert the heat energy in the coolant to electrical power. This generating system may, for example, be a Brayton Cycle power generator system. Discharge coolant line 249 from the power generating system feeds the coolant through radiant heat exchanger 248 located beneath base 214, which thus performs the function of a heat sink for generating system 247 as well as the solar cell cooling circuit. Line 250 connects the outlet of radiant heat exchanger 248 to the inlet of pump 240 which recirculates the cooled fluid back to coolant coils 244. A surge tank 252 is connected to line 250 to permit any necessary fluid expansion in the system without damage. The cooling circuit systems functions would be electrically controlled by control unit 254, which along with pump 240, reservoir/surge tank 252, and other elements of the system would be housed in housing element 238 located beneath base 214. Power from photovoltaic arrays 225 would be carried through output power leads 237 to power output control unit 236, in this arrangement located beneath housing 238, which in a conventional manner would convert and/or distribute the power for use. In a space operation, the open side of enclosure 200, bisected by stabilizing strut 224, would be oriented toward the sun, whereby radiator 248 would always be facing toward black space.

Figure 14:
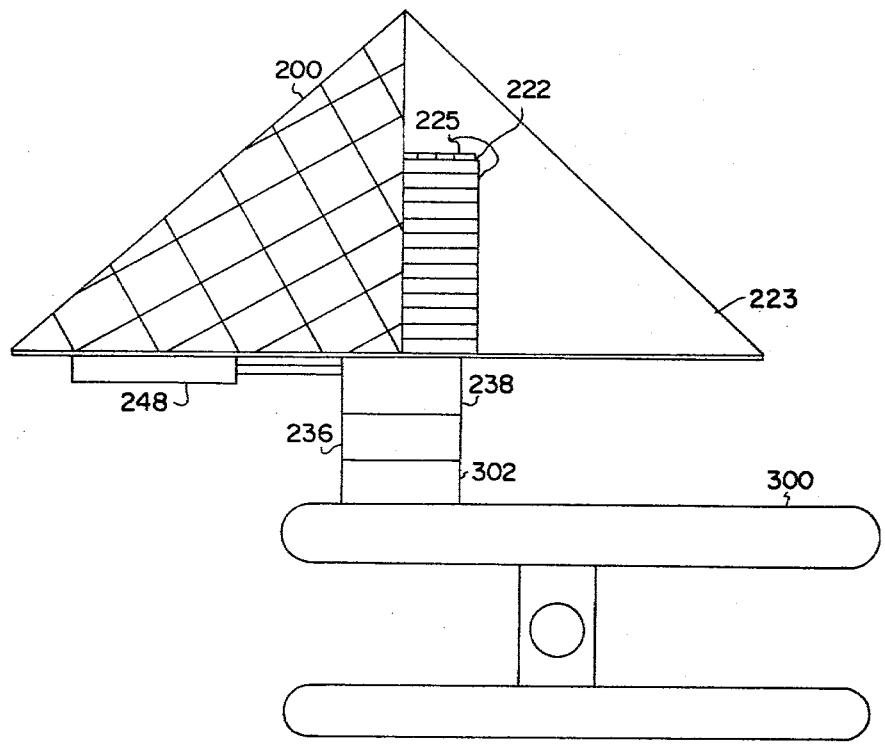
FIG. 14 is an elevational view of an embodiment of this invention as would be used in conjunction with a space station.

Applications of the invention for space power generation are many and varied. Typically, a thus powered generator could be connected to a satellite or to a space station to provide necessary power. As an example, shown in FIG. 14 is enclosure 200 with liquid cooled photoelectric cell arrays 225 mounted on structure assembly 222, and with cooling control system housing 238 beneath. A power output control unit 236 is positioned beneath housing element 238, and it is connected to a space station 300 by adapter 302. With the open side 223 of enclosure 200 oriented toward the sun, radiator 248 would face toward black space. From power control unit 236, the available power would be routed through adapter 302 to space station 300 for use.

Figure 16:
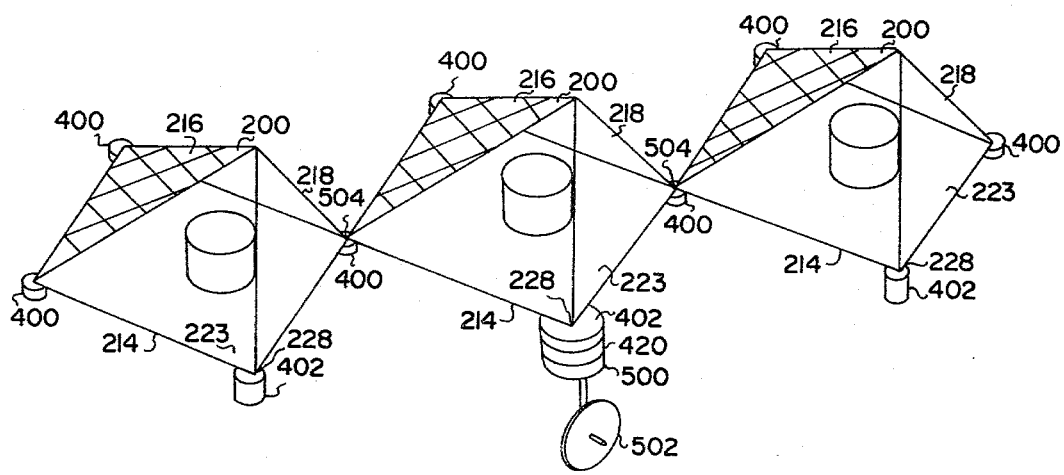
FIG. 16 is a diagrammatic illustration of an embodiment of the invention as a cluster of photovoltaic generators connected together in space for supplying large amounts of power for radio frequency transmission.
Figure 15:
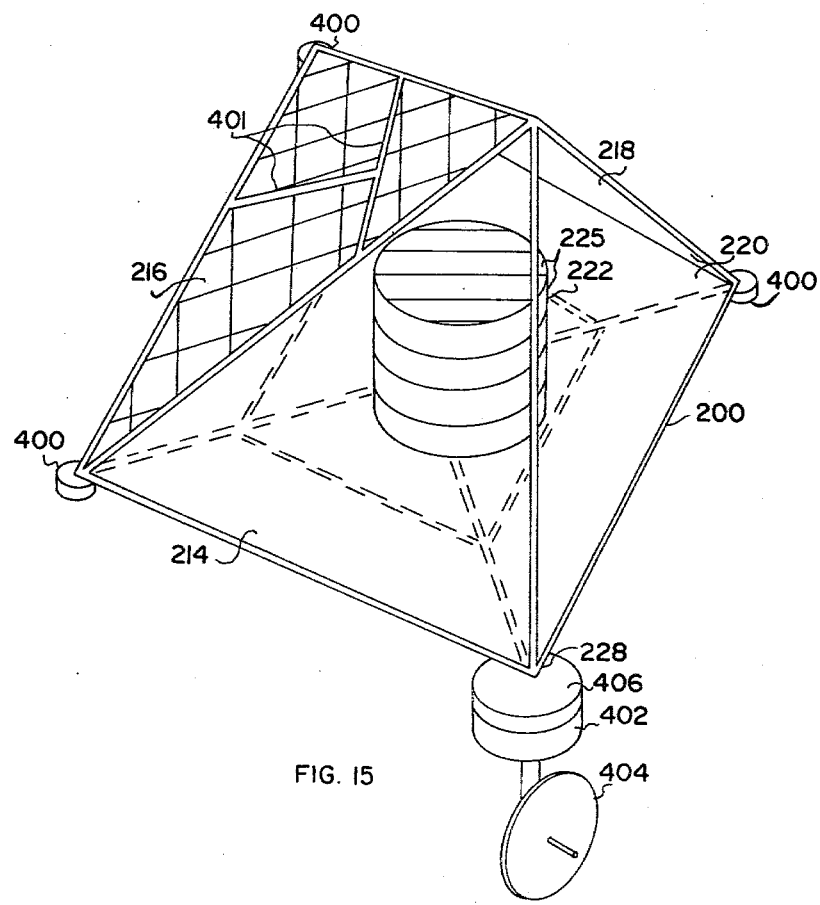
FIG. 15 is an oblique illustration of an embodiment of the invention as a large space photovoltaic power generator being free flying with the ability to transmit power by radio frequencies.

This invention is also applicable for large space power generating concepts, such as a configuration for a Space Power Satellite (SPS) as being studied by NASA. Typically, such an arrangement would be a free flying configuration as illustrated in FIG. 15. In this configuration, the dimensions of the base and height of enclosure 200 would be measured in hundreds or thousands of feet, with photovoltaic arrays 225 and structure 222, upon which they are mounted, proportionally sized. The construction would be similar to that described in FIG. 9, except additional support members 401 would be required over base 214 and opaque sides 216 and 218 to properly support the thin plastic covering 220, having an inward facing reflective surface, to the large spans. To maintain proper orientation and position, station keeping modules 400 would be located at three of the base corners. These station keeping modules would contain control moment gyroscope systems (not shown) and liquid rocket reaction control motor systems (not shown) which would respond to signals received from orientation control unit 406, located under corner 228 of base 214, and by their appropriate actions maintain proper orientation. Under control unit 406 would be located a power station 402. Electric power generated in the solar cells would be brought to power station 402, from where a portion would be used to operate orientation control unit 406 and modules 400 and other systems of the SPS, and the remainder would be converted to radio frequency energy to be beamed to a desired location, such as a receiving station on earth, through antenna 404 which can swivel to maintain desired orientation. Cooling of the solar cells may be effected by either the heat sink concept shown in FIGS. 10 and 11 or the liquid cooling system shown in FIGS. 12 and 13. A number of the configurations shown in FIG. 15 may be connected together, as illustrated in FIG. 16, for a very large power generating system. In this arrangement, each of the enclosure units 200 would be delivered to the desired earth orbit, such as geosynchrous orbit, there the units would be connected to one another at corners 504 of bases 214 where opaque sides 216 and 218 intersect with open sides 223. A station keeping module 400 would be located at this juncture with additional modules located at the other base 214 corners. A power station 402 would be under the open side base corner 228 of each enclosure unit 200 to collect the power from the photovoltaic arrays of each unit and to provide power for that unit's operation. A central orientation control unit 420, located under power station 402 of a centrally located enclosure unit 200, would provide the necessary orientation control signals to all of station keeping modules 400. By such an arrangement, each unit can be maintained in proper position and orientation relative to each other. The remaining power from each unit would be sent by wires to a central power station 500 located beneath central orientation control unit 420, from where the power would be converted to radio frequency energy for transmission to earth by antenna 502.

While the structures thus far described have utilized photovoltaic cells for, for example, photocells 120 shown in FIG. 8, or photocells 225 shown in FIG. 14, which function to generate electricity, it is to be appreciated that the structures may be employed to focus energy onto a photocell or photocells of the photoresistive type as where employed in a signalling system.

Having thus described my invention, what is claimed is:

1. An energy collector comprising:
   a base and a pyramidal-shaped structure extending around and upward from said base;
   a wall region of said structure extending approximately one-half way around said base, and said wall region extending upward linearly at an angle of less than 90° with respect to said base;
   said base and said wall region having a radiant energy reflective inner side, and approximately the remainder of the way around said structure being radiant energy transmissive; and
   an energy absorber comprising a circular spiral of tubing rising above the base and positioned centrally with respect to said structure, and said absorber being positioned and configured to:
   directly receive a portion of the radiation passing through the transmissive remainder of said structure,
   receive some radiation via a path through said transmissive remainder onto said reflective side of said structure and then reflected onto said absorber,
   receive some radiation via a path through said transmissive remainder of said structure onto said base reflective inner side and then reflected onto said absorber, and
   to receive some radiation via a path through said transmissive remainder of said structure that includes both said base reflective inner side and said reflective side of said structure;
   whereby a substantial amount of all of the radiant energy passing through said transmissive remainder of said structure would be captured by the absorber, thereby effectively heating fluid directed through said tubing.

2. An energy collector as set forth in claim 1 wherein said absorber extends through and is supported below said base.

* * * * *